United States Patent [19]

Lokken

[11] Patent Number: 4,811,793
[45] Date of Patent: Mar. 14, 1989

[54] FIRE DAMAGE CONTROL SYSTEM FOR AIRCRAFT

[76] Inventor: Oddvin Lokken, 131 Forest Ave., Rye, N.Y. 10580

[21] Appl. No.: 34,788

[22] Filed: Apr. 3, 1987

[51] Int. Cl.⁴ ............................................. A62C 3/08
[52] U.S. Cl. ...................................... 169/48; 169/62; 244/121; 244/129.2
[58] Field of Search .................. 169/48, 62, 43, 45, 169/46, 91; 244/117 A, 121, 129.2, 114 B, 133

[56] References Cited

U.S. PATENT DOCUMENTS

| | | | |
|---|---|---|---|
| 2,560,269 | 7/1951 | Berner | 169/48 |
| 3,090,212 | 5/1963 | Anderson et al. | 244/117 A X |
| 3,138,009 | 6/1964 | McCreight | 244/117 A X |
| 3,404,089 | 10/1968 | Holzinger | |
| 3,666,707 | 5/1972 | Livingston | |
| 3,854,535 | 12/1974 | Kehr et al. | |
| 3,935,099 | 1/1976 | Weaver et al. | |
| 4,121,790 | 10/1978 | Graham | |
| 4,420,047 | 12/1983 | Bruensicke | |

*Primary Examiner*—Sherman D. Basinger
*Assistant Examiner*—Paul E. Salmon
*Attorney, Agent, or Firm*—Jacobs & Jacobs

[57] ABSTRACT

Apparatus for shielding an area of an aircraft from the adverse effects of a fire, which comprises a wall for enclosing at lease a portion of the area of the aircraft to be shielded, a highly water-absorbent polymer operatively associated with the wall, a reservoir for storing water, conduits for establishing liquid communication between the reservoir and the polymer, and a device for delivering water from the reservoir to the polymer via the conduits.

12 Claims, 3 Drawing Sheets

FIRE DAMAGE CONTROL SYSTEM FOR AIRCRAFT

The present invention relates to a fire damage control system for aircraft and more particularly to an apparatus for limiting the damage caused by aircraft fire through the use of a system based upon a water absorbent polymer.

The terrible effects of aircraft fires are sufficiently well known as not to require a detailed explanation herein. Any system or apparatus that could provide additional time for the passengers and crew to escape would therefore be highly desirable. The present invention accomplishes this by enclosing major areas of the aircraft, such as all or a major portion of the fuselage thereof, with a polymer that is highly water absorbent. Such polymers not only absorb large quantities of water per unit weight of the polymer, but the absorption takes place rapidly. The water absorbent polymer can be installed in the aircraft as a coating or layer on the existing thermal and/or sound insulation surrounding the fuselage or other portion of the aircraft, or the polymer can be contained within porous packages that are in turn secured to the desired portion of the aircraft to be protected.

Aircraft normally contain large quantities of water, both for consumption and for operation of the toilets. For example, a 747 aircraft may contain 250 gallons of water or more. The apparatus of the present invention includes means for directing this water to the water absorbent polymer in the event of a fire, so that a water barrier is formed surrounding the portion of the aircraft to be protected. To this end, the apparatus of the present invention includes a piping system leading from the source of water to the water absorbent polymer.

The water barrier formed when the polymer absorbs water will shield the interior of the aircraft enclosed by the barrier for a predetermined period of time, until after the water is vaporized by the heat of the fire. Even if only a very short period of time is obtained, many lives could be saved. In serious fires, even seconds are important.

Water absorbent polymers useful in the present invention are any of the polymers disclosed in U.S. Pat. Nos. 3,669,103, 3,670,731 and 3,935,099. Other superabsorbent polymers are known, such as used in sanitary products and diapers. As an example, commercially available starch-graft copolymers containing gelatinized starch and saponified polyacrylonitrile under U.S. Pat. No. 3,935,099 can absorb as much as 1000 times their weight in water.

The present invention is illustrated in terms of its preferred embodiments in the accompanying drawings, in which.

Figure 1:
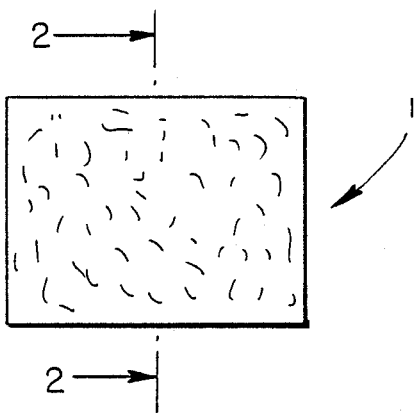
FIG. 1 is a plan view of insulation having a layer of a water-absorbent polymer thereof.
Figure 2:
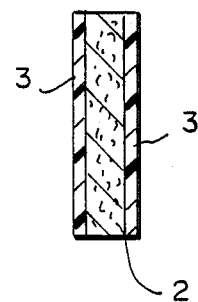
FIG. 2 is a view in section taken along lines 2—2 in FIG. 1.

Referring to FIGS. 1 and 2, a conventional aircraft thermal insulation pad 1 has an internal layer 2 of conventional insulation material and outer layers 3 of of a water absorbent polymer such as described in U.S. Pat. No. 3,935,099. The layers 3 can be formed by any means known in the art, such as adhesively securing particles, fibers or films of the desired water absorbent polymer in the layer 2.

Figure 3:
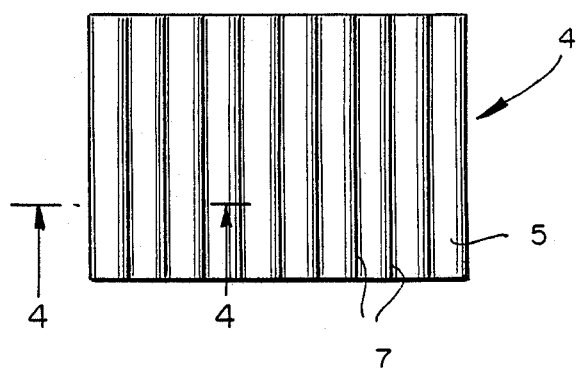
FIG. 3 is a plan view of an alternative embodiment of the invention.
Figure 4:
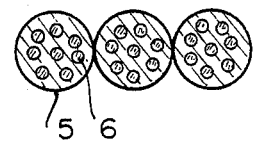
FIG. 4 is a detail view, in section, taken along lines 4—4 in FIG. 3.

FIGS. 3 and 4 illustrate an alternative embodiment of the invention, in which the pad 4 comprises a porous fabric 5, such as in the form of a mesh or net, containing particles and/or fibrous batting 6 of the water absorbent polymer. For ease of handling and to confine the polymer 6, the pad 4 has stitching 7 thus forming small subunits of the pad.

Figure 5:
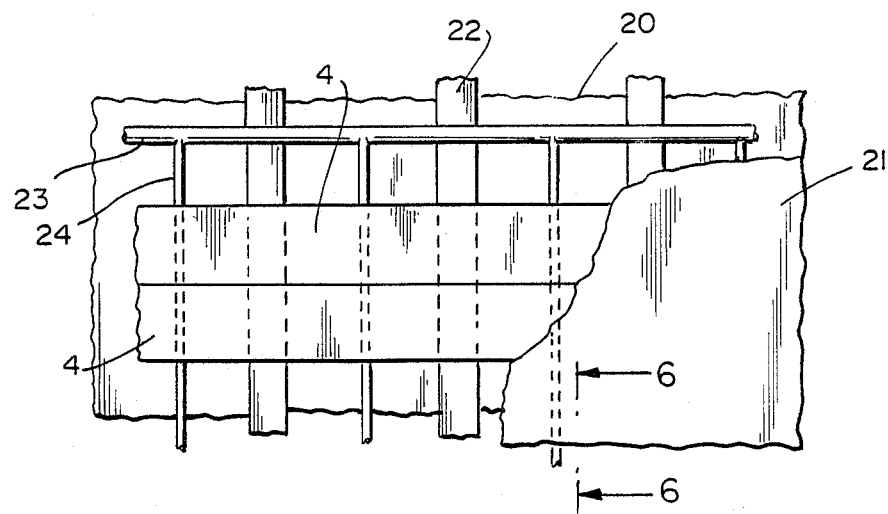
FIG. 5 is a schematic view of a portion of an aircraft having the fire-retardant system installed therein.

FIG. 5 shows a portion of an aircraft having outer wall 20, inner wall 21 and studs 22, which is representative of the "sandwich construction" employed in aircraft design. As shown in FIG. 5, pads 4 are secured to the studs 22 in the space between walls 20, 21. Only two such pads 4 have been shown for ease of presentation. While FIG. 5 shows pads 4 installed between walls 20, 21, any of the pads used in the present application may be used, even in combination.

Figure 6:
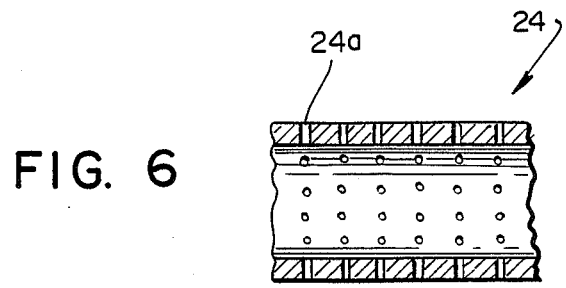
FIG. 6 is a detail view, in section, of a pipe used to supply water to the fire-retardant material.

Also provided between walls 20,21 is header 23 and distribution pipes 24. Header 23 is connected to a source or reservoir of water, as will be described in detail hereinafter, and header 23 distributes the water to the pads 4 by means of the distribution pipes 24. As more clearly seen in FIG. 6, distribution pipes 24 are porous by means of the numerous apertures or perforations 24a therein. As can be understood, water flowing through header 23 and distribution pipes 24 is brought into contact with the polymeric material 6 which in turn rapidly absorbs the water, on the order of 500-600 times its weight. There is thus rapidly provided between walls 20,21 a large quantity of water spread over a large area, thereby rapidly providing a water-barrier to protect the inside of the aircraft.

Figure 7:
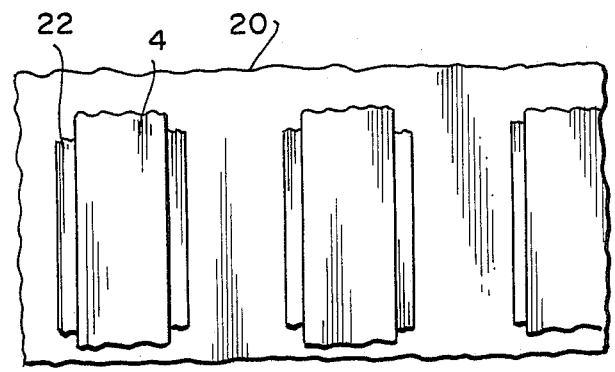
FIG. 7 is a view similar to FIG. 5, showing an alternative embodiment of the invention.
Figure 8:
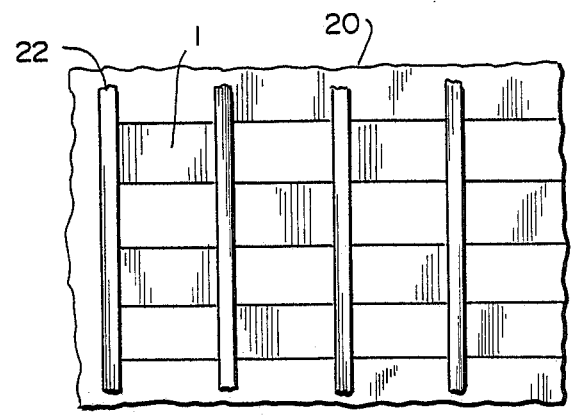
FIG. 8 is a view similar to FIG. 5, showing another embodiment of the invention.

To reduce the weight of the fire-retardant system of the present invention, it is possible to install the pads 4 between every other pair of studs 22, as shown in FIG. 7. Alternatively, the pads 1 can be installed in checker board fashion as shown in FIG. 8.

Figure 9:
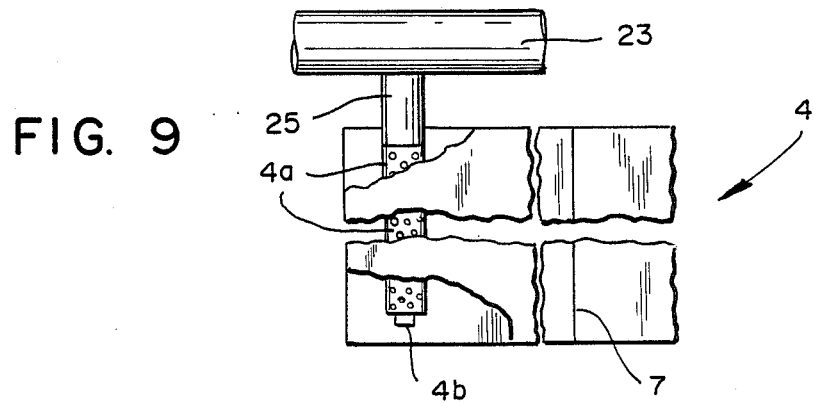
FIG. 9 is a detail view of an alternative fire-retardant material used in the present invention.

FIG. 9 illustrates an alternative embodiment of the invention in which a pad 4' has a number of internal distribution pipes 4a, one of which is shown in FIG. 9. The internal pipes 4a are porous and are constructed in the same manner as distribution pipe 24. When using the pads 4', the header 23 is provided with short distribution pipes 25, which can be friction fitted or otherwise secured to an internal pipe 4a of the pad 4' immediately below header 23. Each pipe 4a also has a nipple 4b or other element arranged such that it can be fitted into a pipe 4a in a pad 4' immediately below (not shown).

Figure 10:
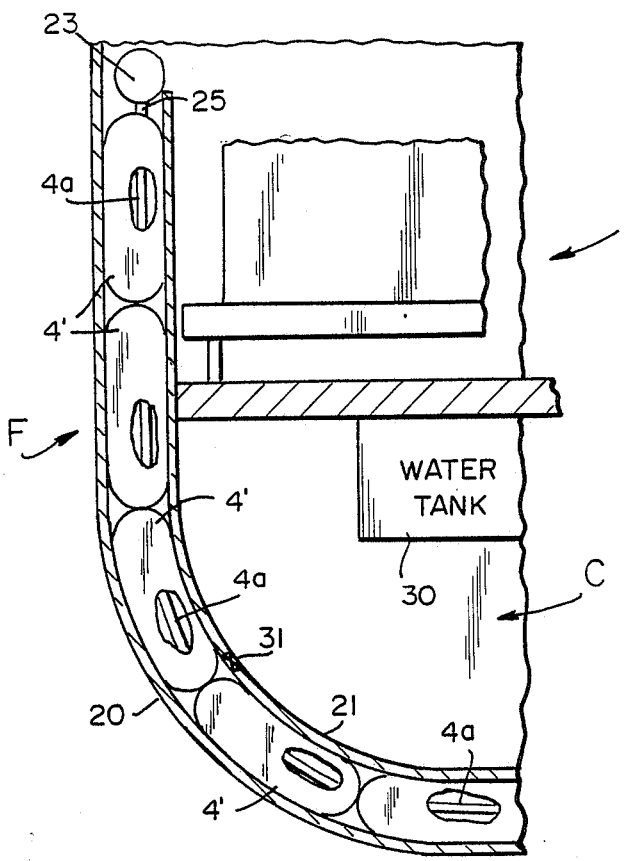
FIG. 10 is a schematic view of a portion of an aircraft equipped with the fire-retardant system according to the present invention.

FIG. 10 shows the fire retardant system according to the invention installed in the fuselage F of an aircraft. While FIG. 10 illustrates the use of the pads and the internal water pipes 4a, it is to be understood that the other pads useful in the present invention may likewise be used therein. As shown in FIG. 10, the pads 4' are located between walls 20,21 of the aircraft with the studs 22 being omitted for clarity. The internal distribution pipes 4a are connected to one another and to the distribution pipe 25, which is in turn connected to the header 23. While only one such header 23 is shown, it is contemplated that a number of headers 23 will be employed, spaced around the periphery of the fuselage F. Each header 23 is supplied with water from a suitable reservoir, such as water tank 30 located in the area C below the passenger area P. The fluid communication between the water tank 30 and each header 23 is accomplished by a convention distribution system (not shown).

In the event of a fire, water is supplied to the pads 4' and is rapidly absorbed by the polymer 6. The heat of the fire will raise the temperature of the water absorbed by the polymer 6 in the pads 4'; this heat-absorbing effect providing additional time for evacuation of the passengers from passenger area P. At some point, the temperature of the water will be raised to its boiling point and quantities of steam will be released into the space between walls 20,21. Pressure release valves 31 are provided in wall 21, one of which is shown in FIG. 10. A sufficient number of pressure release valves 31 is provided to enable proper evacuation of the steam. It is preferred to release the steam through the pressure release valve 31 and into the area C, which normally would be the cargo area, to avoid release of the steam into the atmosphere. If such occurred without proper precautions while the aircraft was at a high altitude, the sudden depressurizing could lead to worse damage than the fire.

Figure 11:
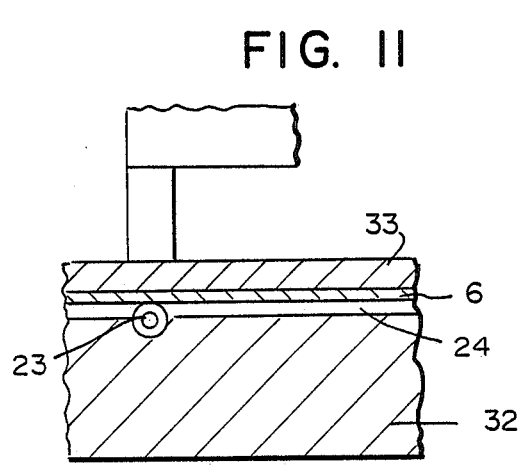
FIG. 11 is a detail view, partly in section, of the installation of a fire-retardant material on the floor of the passenger compartment.

FIG. 11 shows a further embodiment of the invention, in which the floor 32 of the passenger compartment P is provided with a layer 6 of the water absorbent polymer, either in the form of particles, fibers or film as discussed above. A series of water distribution pipes 24 are provided in the floor 32 in contact with layer 6, the pipes 24 being fed by headers 23, which are in turn connected to the reservoir 30 by suitable means (not shown). In this way, a water-barrier can be provided under the carpeting 33 of the passenger compartment P, thereby providing yet a further barrier to the fire.

While the fire-retardant system is usefully employed in the fuselage and/or floor, it may also be installed to provide a water-barrier around the lavatories.

Figure 12:
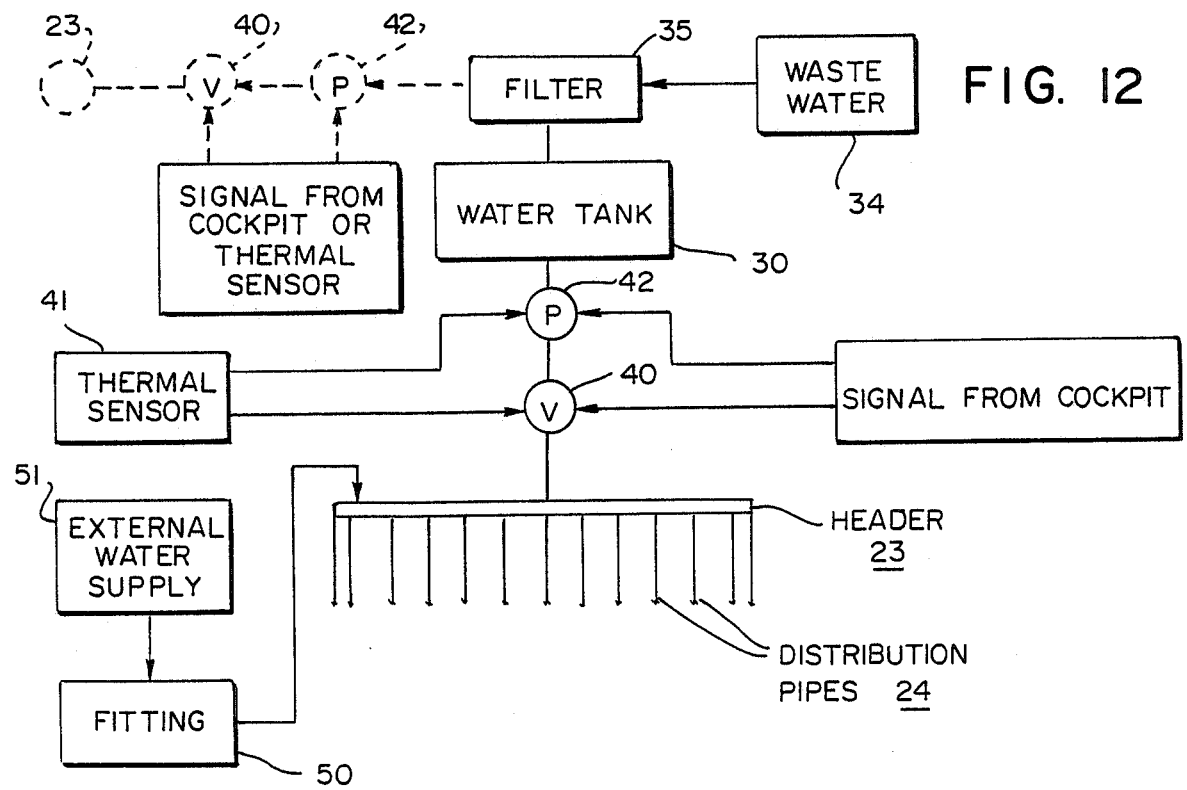
FIG. 12 is a diagram showing the operation of the fire-retardant system according to the present invention.

FIG. 12 diagramatically shows the control of the fire-retardant system according to the present invention. One or more water tanks 30 are connected to the headers 23 by means of control valves 40. Control valves 40 are designed to open in response to the thermal sensor 41 when the sensor detects a temperature above a predetermined value and/or by a signal delivered to control valve 40 by personnel in the cockpit of the aircraft. When valve 40 opens, water flows to the polymer via header 23 and distribution pipes 24. It is preferred that a pump 42 be used to pump water from reservoir 30, the pump being activated in the same manner as valve 40. In some cases it may be desirable to supplement the water carried in water tank 30 by filtration of waste water obtained from the lavatories on the aircraft. Thus, FIG. 12 shows a reservoir 34 containing waste water collected from the lavoratories and a filter 35 for removing solids from the waste water. If desired, filter 35 can also purify waste water delivered thereto by admixture with a suitable antiseptic, as is known. Purified filtered waste water can be delivered to water tank 30 as shown. Alternatively, or in addition, filtered but not sterilized water can be delivered by means of a pump 42 and a valve 40 to a header 23 in the cargo area, as shown in dotted line.

In some cases, it may be desirable to supply water to the polymer from outside the aircraft while the aircraft is on the ground. To accomplish this, a plurality of fittings 50 are located at spaced apart locations, such as at the wing tips and the nose and tail of the aircraft. Suitable conduits (not shown) connect the fittings 50 to the desired headers 23. When needed, an external water supply 51 is connected to the desired fittings 50. For example, when the aircraft is on the ground there may be a fire at the nose such that it is safe to approach the tail, in which case water can be introduced through a fitting 50 at the tail. Fittings 50 may also be used when there is a potential danger of fire, as in a hijacking, in which case water is introduced through a fitting 50 while the aircraft is on the ground to provide a protective water barrier.

In experiments to demonstrate the feasibility of the present invention, polymer according to U.S. Pat. No. 3,935,099 was placed in a vessel and predetermined amounts of water were added and the time was noted for complete absorption of the water. It took 5.5 seconds for one part by weight of polymer to absorb 57 parts by weight of water and it took 18 seconds for one part by weight of polymer to absorb 84 parts by weight of water. In both cases, the water was at 75° F. In both cases, there was an extremely rapid absorption of water.

In another experiment, a double walled metal chamber of 20 cm in diameter having a closed end was heated from a temperature of 75° F. by application of an open flame to the side, to temperatures of 100° F., 150° F. and 300° F. It took 14 seconds to raise the temperature from 75° F. to 100° F., 16 seconds to raise the temperature from 75° F. to 150° F., and 17.8 seconds to raise the temperature from 75° F. to 300° F. This experiment was repeated, except that the space between the double walls was filled with gelatinized starch/saponified polyacrylonitrile polymer that had absorbed approximately 568 times its weight in water. The polymer is manufactured by Henkel Corporation. In this experiment, the temperature remained at 75° F. for 18 minutes and 11 seconds, and the temperature of 150° F. was not reached until 21 minutes and 47 seconds after the start of the experiment. This demonstrates the significant increase in time before the temperature in the passenger compartment of an aircraft would reach intolerable levels as a result of the fire-retardant of the present invention.

I claim:

1. Apparatus for shielding an area of an aircraft from adverse effects of a fire, which comprises wall means for enclosing at least a portion of the area of the aircraft to be shielded, a highly water-absorbent polymer capable of absorbing at least about 500 times its weight of water operatively associated with said wall means, a reservoir for storing water, conduit means for establishing liquid communication between said reservoir and said polymer, and delivery means for flowing water from said reservoir to said polymer via said conduit means.

2. Apparatus according to claim 1, wherein said aircraft comprises an outer surface enclosing an interior, said wall means has an inner wall facing the interior of the aircraft and an outer wall constituting the outer surface of the aircraft, and said polymer is provided between said walls.

3. Apparatus according to claim 2, wherein said polymer is carried by insulation between said walls.

4. Apparatus according to claim 2, wherein said polymer is within a porous container, and a plurality of said porous containers are provided between said walls.

5. Apparatus according to claim 1, wherein said aircraft comprises a fuselage and said wall means is at least a portion of said fuselage of the aircraft.

6. Apparatus according to claim 2, wherein said aircraft includes a passenger area within said fuselage, and said wall means at least partially encloses said passenger area of the aircraft.

7. Apparatus according to claim 6, wherein said polymer is carried by insulation between said walls.

8. Apparatus according to claim 6, wherein said polymer is within a porous container, and a plurality of said porous containers are provided between said walls.

9. Apparatus according to claim 6, wherein said passenger area includes a floor and carpeting on said floor, a layer comprising said polymer is provided between said floor and said carpeting, and said conduit means includes means for establishing communication between said reservoir and said layer.

10. Apparatus according to claim 1, including means for supplying said reservoir with waste water collected from lavoratories aboard the aircraft.

11. Apparatus according to claim 1, including means for providing liquid communication between said polymer and a source of water located outside said aircraft.

12. Apparatus according to claim 11, wherein said polymer comprises gelatinized starch and saponified acrylonitrile.

* * * * *